United States Patent [19]

Gorin

[11] 4,008,310

[45] Feb. 15, 1977

[54] REGENERATIVE SULFUR DIOXIDE SCRUBBING SYSTEM

[75] Inventor: Everett Gorin, Pittsburgh, Pa.

[73] Assignee: Continental Oil Company, Ponca City, Okla.

[22] Filed: May 27, 1975

[21] Appl. No.: 581,074

[52] U.S. Cl. .............................. 423/242; 423/428
[51] Int. Cl.² .................... C01B 17/00; C01B 7/00
[58] Field of Search .......................... 423/242–244, 423/186, 189, 563, 428

[56] References Cited

UNITED STATES PATENTS

| 3,574,097 | 4/1971 | Urban | 423/563 |
|---|---|---|---|
| 3,649,183 | 3/1972 | Urban | 423/563 |
| 3,728,433 | 4/1973 | Urban | 423/242 |
| 3,764,653 | 10/1973 | Urban | 423/242 |
| 3,859,416 | 1/1975 | Urban | 423/242 |
| 3,937,787 | 2/1976 | Gorin et al. | 423/242 |

Primary Examiner—Oscar R. Vertiz
Assistant Examiner—Gregory A. Heller
Attorney, Agent, or Firm—William A. Mikesell, Jr.; D. Leigh Fowler, Jr.; Stanley J. Price, Jr.

[57] ABSTRACT

An aqueous regenerative SO₂ scrubbing system is provided which has a scrubbing loop and a regeneration loop. The scrubbing loop contains a scrubber through which a thiosulfate-rich aqueous solution containing an alkali metal carbonate continuously circulates under sulfite-forming conditions. The sulfute in the spent absorbent solution is converted to thiosulfate in a sulfite conversion zone located in the scrubbing loop but outside the scrubber. The sulfite conversion is effected by means of a reducing agent containing a water soluble alkali metal hydrosulfide as the essential sulfite reducing agent. The regeneration loop serves to convert the incremental portion of thiosulfate formed in the scrubbing loop to H₂S and an aqueous solution containing the required amounts of alkali metal carbonate and of alkali metal hydrosulfide for the scrubbing loop. By means of a two-step process in the regenerator, the proper ratio of alkali metal hydrosulfide to carbonate for maintaining the system in the correct internal balance of reagents is established, whereby stable continuous operation of the entire system is achieved.

5 Claims, 1 Drawing Figure

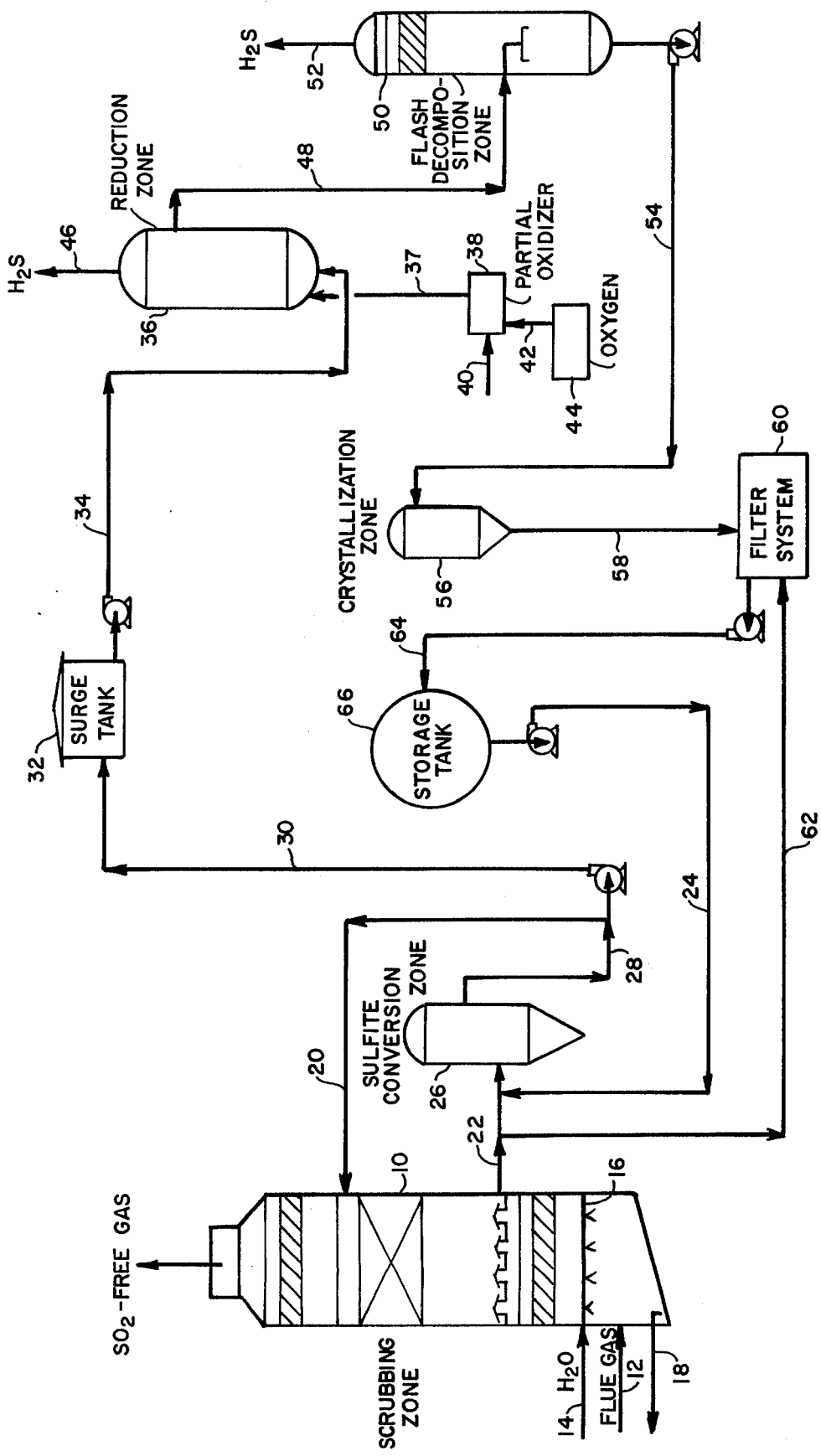

REGENERATIVE SULFUR DIOXIDE SCRUBBING SYSTEM

CROSS REFERENCES TO RELATED APPLICATIONS

Related applications, describing and claiming certain subjects matter hereinafter disclosed are (1) an application, Ser. No. 358,786, filed May 9, 1973, entitled "Treatment of Gases Containing Sulfur Dioxide," to be issued Feb. 10, 1976 as U.S. Pat. No. 3,937,787; (2) an application, Ser. No. 410,722, filed Oct. 29, 1973, entitled "Treatment of Gases Containing Sulfur Dioxide;" (3) an application entitled "Sulfur Dioxide Scrubbing System," Ser. No. 581,073, filed May 27, 1975; (4) an application entitled "Reduction of Aqueous Thiosulfate Solutions," Ser. No. 583,211, filed May 29, 1975; (5) an application entitled "Method of Controlling the Reduction of Aqueous Thiosulfate Solutions," Ser. No. 581,178, filed May 27, 1975, all of these applications assigned to the assignee of the present application; and (6) an application, Ser. No. 498,683, filed Aug. 19, 1974, entitled "Removal of Sulfur Dioxide from Gases Containing Sulfur Dioxide and Oxygen," now U.S. Pat. No. 3,906,080, assigned to Consolidation Coal Company, a wholly-owned subsidiary of Continental Oil Company.

BACKGROUND OF THE INVENTION

1. Field of the Invention

The present invention relates to aqueous regenerative $SO_2$ scrubbing systems which use a sulfite-forming $SO_2$ absorbent.

2. Description of the Prior Art

The aqueous regenerative $SO_2$ scrubbing system of which the present invention is an improvement is fully described in the above-related applications. It comprises a scrubbing circuit and a regenerative section. In the scrubbing circuit, there is a scrubber through which an aqueous scrubbing solution continuously circulates in contact with the $SO_2$-containing gas. A substantially constant high concentration, i.e. at least ten percent (10%) by weight of either sodium or potassium thiosulfate is maintained in the aqueous scrubbing solution throughout its traverse around the scrubbing circuit. The effective $SO_2$ absorbent is not thiosulfate but rather is either sodium or potassium carbonate dissolved in the aqueous scrubbing solution. The term "carbonate" as used herein includes both carbonate ($CO_3^=$) and bicarbonate ($HCO_3^-$). The carbonate is converted by reaction with $SO_2$ to sulfite in the scrubber under sulfite-forming conditions. Similarly, the term "sulfite" as used herein includes both sulfite ($SO_3^=$) and bisulfite ($HSO_3^-$). The letter "M" as used hereinafter means either sodium or potassium.

A second very rapid reaction occurs in the scrubbing circuit but external to the scrubber. That reaction is the conversion of sulfite by MHS to thiosulfate ($M_2S_2O_3$) in a sulfite conversion zone, whereby the sulfite concentration in the scrubbing solution is reduced to very low levels.

The required carbonate and the required MHS are produced in the regenerative section by reacting the $M_2S_2O_3$ which is withdrawn from the scrubbing circuit in a slipstream with a reducing gas containing CO at an elevated temperature and pressure. The regeneration reaction may be expressed as:

$$3\ M_2S_2O_3 + 12\ CO + 5\ H_2O \rightarrow 2\ M_2CO_3 + 2\ MHS + 4\ H_2S + 10\ CO_2 \qquad 1.$$

However, in reality, there appear to be several side reactions in which products may react with the reactants and with each other. Accordingly, careful control of the conditions under which reaction (1) is conducted is essential to form the required quantities of carbonate and MHS for return together in the regenerated aqueous solution to the scrubbing circuit to repeat the cycle.

The maintenance of the proper ratio of MHS to carbonate in the regenerated solution which is returned to the sulfite conversion zone in the scrubbing circuit is essential to satisfactory operation of the scrubbing and regenerative cycle. That ratio is maintained provided the following ratio, R, is maintained at or below 1 in the regenerated solution, preferably between 0.75 and 0.98.

$$R = \frac{2(S^o) + 3(S^{-2})}{\Sigma M}$$

where:
- $(S^o)$ = gram atoms sulfur with valence number zero/100 grams solution.
- $(S^{-2})$ = gram atoms sulfur with valence equal to −2/100 grams solution.
- $\Sigma M$ = gram atoms of M/100 grams solution present in said aqueous effluent as MHS, $M_2S$, $M_2S_x$, $M_2CO_3$, $MHCO_3$, and MOH (where M is Na or K).

When R is greater than 1, there will be excess MHS and associated sulfides in the regenerated solution. Such excess will reach the scrubbing zone of the scrubbing circuit where it is converted to $H_2S$ by hydrolysis and/or $CO_2$ stripping. When R is less than 0.75, there is insufficient MHS and associated sulfides to maintain the sulfite concentration of the recirculating solution at the desired predetermined low level.

Prior art patents which describe processes similar in some respects to the above-described process include the following: U.S. Patent Nos. 1,937,196, H. A. Gollmar, Nov. 28, 1933; 2,729,543, J. L. Keller, Jan. 3, 1956; 3,431,070, J. L. Keller, Mar. 4, 1969; 3,574,097, P. Urban, Apr. 6, 1971; 3,635,820, P. Urban, Jan. 18, 1972; 3,644,087, P. Urban, Feb. 22, 1972; 3,714,338, P. Urban, Jan. 30, 1973; 3,859,416, P. Urban, Jan. 7, 1975.

3. The Problem

The ratio, R, may be established and maintained at or below 1 by conducting the reduction of thiosulfate in a single reduction zone. This zone, as will be later described, operates at a temperature and pressure which are much higher than those maintained in the scrubbing circuit. It has been discovered that the value of R undergoes a significant decrease in the course of the return of the effluent aqueous product from a single reduction zone to the scrubbing circuit; and may even be of such magnitude as to cause the value of R to fall below the desired range of 0.75 to 0.98.

Accordingly, the primary object of this invention is to provide for the assured return to the sulfite conversion zone of the above-described scrubbing circuit of a regenerated aqueous solution having not only the desired value of the ratio, R, but also a value of R which is stable.

SUMMARY OF THE INVENTION

The improvement of this invention is in the regenerative section of the above-described wet regenerative $SO_2$ scrubbing system. The improvement involves the addition of a flash decomposition zone to the thiosulfate reduction zone. In the thiosulfate reduction zone, conditions are selected for the reduction of thiosulfate so that the value of the ratio, R, for the effluent aqueous solution from said thiosulfate reduction zone shall be greater than 1 and less than 1.5, instead of a value of 1 or less. The flash decomposition zone is operated under conditions effective to reduce the value of R to a value from 0.75 to 1.0 inclusive. The change in conditions which is critically essential to the reduction in the value of R is reduction in pressure. Because of the reduction in pressure, $MHCO_3$ (where M is Na or K) is converted to $M_2CO_3$ through the reaction $$2\ MHCO_3 = M_2CO_3 + H_2O + CO_2 \qquad 2.$$

and MHS is converted to $MHCO_3$ through the reaction $$MHS + H_2O + CO_2 = MHCO_3 + H_2S$$

Water also flashes from the solution; and the latent heat supplied to the water vapor causes a substantial reduction in the temperature of the liquid.

The objects and advantages of the present invention will become more apparent upon reference to the following description of the preferred embodiment and to the accompanying drawing in which the preferred embodiment is schematically shown.

PREFERRED EMBODIMENT

The schematic flowsheet of the accompanying drawing represents the preferred embodiment of the improved process of this invention. The sulfite-forming agent which is preferred for use in the scrubbing zone is potassium carbonate because of the high solubility of potassium thiosulfate in water.

Scrubbing Circuit

Referring to the drawing, an $SO_2$-containing gas, e.g. a flue gas, is introduced into the bottom of a scrubber 10 through an inlet pipe 12. The composition of a typical flue gas from a coal-fired power station using coal with a sulfur content of 2.46 weight percent of the moisture-free coal is as follows, in volume percent: 74.63% $N_2$; 13.98% $CO_2$; 3.30% $O_2$; 0.17% $SO_2$; and 7.92% of $H_2O$. The scrubber 10 may be, for example, a conventional countercurrent or co-current packed tower, spray tower, or other conventional scrubbing apparatus, but the conventional countercurrent packed tower is preferred. The flue gas entering the scrubber may be at a higher temperature than the scrubber and may contain some residual fly ash. Water is fed through a pipe 14 to a washing spray 16 which serves to quench the gas to humidify it and reduce its temperature. Simultaneously, it cleanses the flue gas of solids. The latter are rejected as a slurry through a discharge pipe 18.

An aqueous scrubbing solution containing, in solution, at least ten percent (10%) and preferably more than twenty-five percent (25%) by weight of potassium thiosulfate is continuously fed through a conduit 20 into the top of the scrubber 10. The solution contains at least sufficient potassium carbonate to react with all the $SO_2$ in the flue gas. By the term "carbonate" is meant either $K_2CO_3$ or $KHCO_3$, or mixtures thereof unless otherwise expressly indicated. The scrubbing solution also contains potassium formate and potassium sulfite. Similarly, by the term "sulfite" is meant either $K_2SO_3$ or $KHSO_3$, or mixtures thereof unless otherwise expressly indicated. A typical composition of absorbent solution introduced into the top of the scrubber through conduit 20 is approximately as follows:

| | | |
|---|---|---|
| $K_2S_2O_3$ | 50.0 | wt. % |
| $K_2CO_3$ and $KHCO_3$ | 0.5 | " |
| KOOCH | 5.0 | " |
| $K_2SO_3$ and $KHSO_3$ | 1.5 | " |
| $K_2SO_4$ | 1.0 | " |
| $H_2O$ | balance | |

The flue gas is passed upwardly in countercurrent flow to the aqueous absorbent which enters the top of the scrubber. The temperature within the scrubber is maintained generally between about 120° and 180° F., e.g. about 135° F. The principal reactions occurring in the scrubber may be expressed by the following equations:

$$K_2CO_3 + SO_2 = K_2SO_3 + CO_2 \qquad 4a.$$
$$K_2SO_3 + SO_2 + H_2O = 2\ KHSO_3 \qquad 4b.$$
$$KHCO_3 + SO_2 = KHSO_3 + CO_2 \qquad 4c.$$

The pH of the spent effluent aqueous absorbent leaving the scrubber through conduit 22 is maintained between about 6.0 and 7.8 by regulating the amount of carbonate fed to the scrubber in relation to the quantity of $SO_2$ fed in the flue gas. Generally, the fresh absorbent solution entering the scrubber through conduit 20 will be from 0.2 to 0.8 units higher in pH than the spent effluent absorbent solution. The range of liquid circulation rates through conduit 22 is suitably between 2 and 20 gallons/1000 CF, e.g. 10 gallons/1000 CF of gas entering the scrubber through line 12.

The effluent stream leaving the scrubber contains a mixture of $K_2SO_3$ and $KHSO_3$. The ratio of $K_2SO_3$ to $KHSO_3$ increases with pH. At a pH of 7.0, the molar ratio of $K_2SO_3$ to $KHSO_3$ is approximately one. The $K_2S_2O_3$ concentration remains essentially unchanged from that of the fresh absorbent solution, as does also that of the formate. Thus, the carbonate concentration has dropped close to zero, while the sulfite concentration expressed as weight percent equivalent $KHSO_3$ has increased to approximately 2.0 weight percent. There is a small amount of $K_2SO_4$ in the spent effluent absorbent.

The efficiency of absorption of $SO_2$ and the composition of the effluent aqueous solution are dictated by the feed rate and composition of the regenerated solution entering the scrubbing circuit through conduit 24 which connects with conduit 22. This regenerated solution contains principally KHS, $K_2CO_3$, $KHCO_3$ and KOOCH, along with minor amounts of $K_2S$, $K_2S_x$, KOH, $K_2SO_4$ and $K_2S_2O_3$. The KHS along with the other potassium sulfides and potassium polysulfides react rapidly in a sulfite converter 26 with the sulfite in the spent effluent absorbent. The reaction in the case of KHS and $KHSO_3$, for example, is:

$$2\ KHSO_3 + KHS = 3/2\ K_2S_2O_3 + 3/2\ H_2O \qquad 5.$$

This reaction occurs rapidly at the same or slightly higher temperature than that maintained in the scrubber. A sufficient residence time is provided in the sulfite converter 26 to assure complete consumption of the KHS and the other sulfides. Such complete consumption is essential to avoid evolution of $H_2S$ into the treated flue gas, and is assured by maintaining an excess of $KHSO_3$ in the recirculating solution. The reaction rate of sulfite conversion decreases with increasing pH. For this reason, the operating pH should be maintained below 8 in the sulfite converter 26, preferably between 6.7 and 7.8, e.g. 7.5. A residence time of 0.2 to 5 minutes is usually sufficient to provide for complete consumption of the KHS, and its associated sulfides, in the sulfite converter. At the same time there is, as stated, unreacted sulfite leaving the sulfite converter. The carbonate and formate pass through the converter essentially unchanged. The concentration of thiosulfate increases. It is this increase in thiosulfate content that provides feedstock for producing fresh carbonate and sulfite-reducing agent. The effluent solution is withdrawn from the converter 26 through a conduit 28. The major portion of the stream is recycled to the scrubber 10 through conduit 20. The minor portion, generally less than ten percent (10%) by volume, is pumped into the improved regenerative section whose operation will now be described.

Regenerative Section

The general purpose of the regenerative section is to convert the incremental thiosulfate produced in the scrubbing circuit to (1) hydrogen sulfide gas, (2) the fresh carbonate required as absorbent, and (3) the KHS required for converting sulfite to thiosulfate in the sulfite converter 26. But, additionally and most importantly, the regenerative section must produce these two essential reagents in an aqueous solution with the desired value of the ratio, R, for return through conduit 24 to the scrubbing circuit. The amount of hydrogen sulfide gas evolved in the regenerative section corresponds substantially in mols to the mols of $SO_2$ absorbed in the scrubber.

Adequate conversion of the $SO_2$ to $K_2S_2O_3$ via sulfite reduction in the converter 26, without evolution of $H_2S$ into the treated flue gas, requires that the carbonates ($K_2CO_3$ and $KHCO_3$) and sulfide KHS (together with minor amounts of other sulfides as previously described) in the regenerated solution fed through conduit 24 have the ratio, sometimes called the "acceptability" ratio, R, which has been previously generally defined but is defined again for potassium as follows:

$$R = \frac{2(S^0) + 3(S^{-2})}{\Sigma K}$$

where:
($S^0$) = gram atoms sulfur with valence number zero/100 grams solution.
($S^{-2}$) = gram atoms sulfur with valence number equal to −2/100 grams solution.
$\Sigma K$ = gram atoms of K/100 grams solution present in the regenerated solution fed to the scrubber circuit as KHS, $K_2S$, $K_2S_x$, $K_2CO_3$, $KHCO_3$, and KOH. K present in other compounds such as $K_2SO_4$, KOOCH and $K_2S_2O_3$ is excluded.

The acceptability ratio, R, of the regenerated solution in return conduit 24 should not exceed 1.0 nor be below 0.75; and is preferably within the range 0.75 to 0.98. If R is above 1, KHS will appear in the scrubber with consequent evolution of $H_2S$. On the other hand, R must not be below 0.75, for in this case the sulfite concentration will build up to an unacceptably high value with resultant formation of $K_2SO_4$ in the scrubber as a result of oxidation of the sulfite by the oxygen in the flue gas. By maintaining R in the range of 0.75 to 1.0 inclusive, the sulfite concentration in the scrubbing circuit can be maintained below 3 weight percent of the scrubbing solution and thereby avoid a high rate of formation of $K_2SO_4$ and its subsequent crystallization from solution.

The manner in which my improvement achieves the foregoing objectives will now be described with reference to the drawing.

A small portion, e.g. about 1 percent by volume of the recirculating solution, is drawn off the scrubbing circuit through a conduit 30 to a surge tank 32 and thence pumped through a conduit 34 to a reductor 36. This reductor is adapted to withstand elevated temperatures and pressures and to confine a liquid phase reaction zone. The reductor vessel may be a stirred tank, a bubble column or a packed bed absorber. The withdrawn scrubber solution is subjected to reduction by a reducing gas containing CO as the principal reductant under conditions selected to produce an effluent gas containing $H_2S$ and an effluent aqueous solution whose components have an acceptability ratio, R, greater than one and less than 1.5, e.g. about 1.1. The major portion of the $H_2S$ (which corresponds substantially to the sulfur absorbed in the scrubber) is produced in the reductor. The reaction is conducted in the reduction zone at a temperature between 300° and 600° F., and is preferably non-catalytic in which case a temperature between 400° and 500° F., e.g. 450° F. is preferred. The pressure is sufficient to maintain a liquid phase reaction and is generally between 10 and 100 atmospheres, e.g. 500 psi. The input of gas and the input of feed solution are controlled to provide a mol ratio of CO consumed to $K_2S_2O_3$ consumed at a value of about 4 to 1, although the actual amount of carbon monoxide fed to the reductor is generally in excess of the reaction requirements.

The reducing gas is introduced into the reductor 36 through a conduit 37. It usually consists of a mixture of carbon monoxide, carbon dioxide and hydrogen since such a mixture is readily obtainable by partial oxidation of hydrocarbonaceous fuel. Such a partial oxidation plant is designated in the drawing by the numeral 38. The hydrocarbonaceous fuel, a suitable fuel oil, is introduced into the partial oxidation plant through a conduit 40 while the required oxygen is transferred through a conduit 42 from an oxygen source 44.

Pilot plant kinetic studies indicate that the reduction reaction is liquid-film, mass-transfer controlled at the selected reductor operating pressure and temperature. This reaction requires large interfacial area between the gas and the liquid to achieve high transfer rates. The water content of the aqueous solution in the reductor is in the range of 30 to 70 weight percent. The reductor may incorporate mechanical agitation as well as a gas sparger.

As mentioned, the reaction in the reductor 36 is preferably carried out in the absence of a catalyst in which case the essential reducing agent is carbon monoxide since hydrogen is relatively inert under non-catalytic conditions. Reduction of the $K_2S_2O_3$ in this fashion produces the desired carbonates and sulfides in accordance with the following simplified reactions.

$$K_2S_2O_3 + 4\ CO + 2\ H_2O = K_2CO_3 + 2\ H_2S + 3\ CO_2 \quad 6.$$
$$K_2S_2O_3 + 4\ CO + 3\ H_2O = 2\ KHCO_3 + 2\ H_2S + 2\ CO_2 \quad 7.$$
$$K_2S_2O_3 + 4\ CO + H_2O = 2\ KHS + 4\ CO_2 \quad 8.$$

In addition to the foregoing products, some potassium formate is produced according to the following reactions:

$$K_2CO_3 + 2\ CO + H_2O = 2\ KOOCH + CO_2 \quad 9.$$
$$KHCO_3 + CO = KOOCH + CO_2 \quad 10.$$

The amount of potassium formate (KOOCH) formed reaches an equilibrium value which is controlled by operating with incomplete conversion of the thiosulfate, preferably between about 95 and 99 percent. The equilibrium concentration of formate increases sharply as the thiosulfate conversion approaches 100 percent, to reach very high values in the aqueous effluent from the reductor. It may be desirable to have some formate present since its presence decreases the water vapor present over the scrubbing solution, and thus permits higher operating temperatures in the scrubber.

The effluent gaseous product comprising $H_2S$, $CO_2$ and unreacted CO and $H_2$ is withdrawn through conduit 46. The $H_2S$ may be converted to sulfur, for instance in a Claus plant. The other gases may be separately recovered for recycle as in the case of CO and $CO_2$, or, after removal of the $H_2S$, may serve as a low Btu fuel gas for reheating the $SO_2$-free flue gas.

The desired value of the acceptability ratio, R, i.e. between 1 and 1.5, preferably about 1.1, is readily achieved by proper selection of the conditions maintained in the reductor 36. The ratio of $CO_2$ to CO in the reducing gas fed to the reductor has a significant effect on the value of R. The lower the ratio, the higher is the value of R. A preferred ratio is about 0.5, and may be readily obtained by appropriate recycle of $CO_2$.

The residence time in the reductor is sufficient to assure conversion of at least 80% by weight of thiosulfate, preferably, as stated before, between about 95% and 99%. A suitable residence time for the preferred conversion is about 1 hour.

The effluent aqueous solution having a value of R between 1 and 1.5 is conducted from the reductor 36 through a conduit 48 to a flash decomposition zone suitably confined in a vessel 50. The final adjustment of the acceptability ratio R to the preferred value between 0.75 and 0.98 is achieved in the flash decomposition zone through reduction in pressure by flash decomposition in this zone. The pressure is reduced to about that maintained in the scrubbing circuit. In addition to the evolution of dissolved $H_2S$ and $CO_2$ by the reduction of pressure, $H_2S$ is also released by the decomposition reaction of equation (3). Decomposition of the $KHCO_3$ also yields $K_2CO_3$ (see equation 2). An overhead condenser (not shown) maintains water reflux and overall water balance. The evolved gases may be directed through a conduit 52 to a Claus plant for conversion to sulfur.

The aqueous solution in the flash decomposition zone 50 is pumped through a conduit 54 to a stirred $K_2SO_4$ crystallization zone 56. The cooling necessary to cause crystallization of the $K_2SO_4$ may occur to some extent in the flash decomposition zone 50. Generally, however, the desired cooling is effected by cooling the crystallization zone itself. A temperature between 130° and 200° F. is low enough to precipitate sufficient $K_2SO_4$ to keep the scrubbing solution clear. As more fully described in an application entitled "An Improved Sulfur Dioxide Scrubbing System" filed on even date herewith, the solubility of $K_2SO_4$ is lower in the regenerated solution than in the thiosulfate-rich solution in the scrubbing circuit. The stirred slurry is conducted from the crystallization zone 56 through a conduit 58 to a filter system designated by the numeral 60. The filter cake is washed with spent scrubbing solution withdrawn from the scrubbing circuit through a conduit 62. The sulfite in this spent scrubbing solution reacts with any KHS and other sulfur compounds in the filter cake to form thiosulfate. Hydrogen sulfide emission from the filter system is thereby avoided and an odor-free filter cake is produced. If desired, the wash liquor may be returned to the regenerated solution.

The filtered solution is pumped through a conduit 64 into a regenerated solution storage tank 66 where it is maintained under an inert atmosphere. From this tank, it is withdrawn through conduit 24 at the required rate and fed into the sulfite converter 26 as fresh regenerated scrubber make-up solution.

According to the provisions of the patent statutes, the principle, preferred construction and mode of operation of the invention have been explained and what is considered to represent its best embodiment has been illustrated and described. However, it should be understood that, within the scope of the appended claims, the invention may be practiced otherwise than as specifically illustrated and described.

I claim:

1. In a regenerative system for the removal of $SO_2$ from an $SO_2$-containing gas having a scrubbing circuit which includes a scrubbing zone and a separate sulfite conversion zone in said circuit, and a regenerative section, and where in said scrubbing circuit there is maintained a continuously recirculating aqueous solution which contains in solution either sodium or potassium thiosulfate in a concentration of at least ten percent by weight of said recirculating solution, and where in said scrubbing zone the $SO_2$-containing gas is contacted under sulfite-forming conditions, with said aqueous solution which contains sodium or potassium carbonate as the effective absorbent for the $SO_2$ to convert said effective absorbent to the corresponding sulfite, and where in said separate sulfite conversion zone said sulfite is converted to the corresponding thiosulfate by reaction with the corresponding hydrosulfide and where in said regenerative section a mixture of the required hydrosulfide and the required carbonate is produced in a regenerated aqueous solution, said regenerative section including a reduction zone in which thiosulfate contained in a slipstream withdrawn from said scrubbing circuit is reacted with a reducing gas containing CO as the effective reducing agent, the IMPROVEMENT in the regenerative section, whereby the proper ratio of hydrosulfide to carbonate is maintained in said regenerated solution which is returned to said sulfite conversion zone, which inprovement comprises:

1. conducting the reduction of thiosulfate in said reduction zone by the CO-containing reducing gas under conditions effective to produce an effluent aqueous solution which contains sodium or potassium hydrosulfide and sodium or potassium carbonate in admixture with other by-products in the following ratio, R:

$$R = \frac{2(S^0) + 3(S^{-2})}{\Sigma M}$$

where R has a value greater than 1 but less than 1.5 and
- $(S^0)$ = gram atoms sulfur with valence number zero/100 grams solution,
- $(S^{-2})$ = gram atoms sulfur with valence number equal to −2/100 grams solution, and
- $\Sigma M$ = gram atoms of M/100 grams solution present in said aqueous effluent as MHS, $M_2S$, $M_2S_x$, $M_2CO_3$, $MHCO_3$, and MOH (M is either Na or K)

and thereafter 2. subjecting said effluent aqueous solution to flash decomposition in a flash decomposition zone under conditions effective to produce said regenerated aqueous solution having a value of R in the range of 0.75 to 1 inclusive.

2. The process according to claim 1 wherein the reduction of the value of R in said flash decomposition zone is effected by reducing the pressure maintained in said flash decomposition zone below that maintained in said reduction zone.

3. The process according to claim 2 wherein the conditions maintained in said reduction zone are a temperature between 300° and 600° F., and a pressure between 10 and 100 atmospheres, and where the pressure maintained in said flash decomposition zone is reduced to about that maintained in said scrubbing circuit.

4. The process according to claim 3 wherein the reduction is conducted in said reduction zone under non-catalytic conditions and the temperature maintained in the reduction zone is between 400° and 500° F.

5. The process according to claim 3 wherein the conditions maintained in said flash decomposition zone are effective to produce an effluent aqueous solution having a value of R in the range of 0.75 to 0.98.

* * * * *